United States Patent
Taniguchi et al.

(10) Patent No.: US 6,541,123 B1
(45) Date of Patent: Apr. 1, 2003

(54) POLYOLEFIN FILM FOR STRETCH PACKAGING

(75) Inventors: Kouichirou Taniguchi, Nagahama (JP); Hideki Sasaki, Nagahama (JP); Takuya Kitamura, Nagahama (JP)

(73) Assignee: Mitsubishi Plastics, Inc., Tokyo (JP)

( * ) Notice: Subject to any disclaimer, the term of this patent is extended or adjusted under 35 U.S.C. 154(b) by 0 days.

(21) Appl. No.: 09/700,793

(22) PCT Filed: May 27, 1999

(86) PCT No.: PCT/JP99/02785
§ 371 (c)(1),
(2), (4) Date: Nov. 20, 2000

(87) PCT Pub. No.: WO99/62987
PCT Pub. Date: Dec. 9, 1999

(30) Foreign Application Priority Data

| May 29, 1998 | (JP) | 10-148571 |
| May 29, 1998 | (JP) | 10-148637 |
| Nov. 19, 1998 | (JP) | 10-328889 |

(51) Int. Cl.$^7$ .................. B32B 27/32; C08L 23/10
(52) U.S. Cl. ........... 428/520; 428/516; 428/523; 525/240; 525/241; 526/348; 526/348.1
(58) Field of Search ................ 525/240, 241, 525/88; 428/500, 523, 520, 516; 526/348, 348.1

(56) References Cited

U.S. PATENT DOCUMENTS

| 5,486,572 A | * | 1/1996 | Fujita et al. .......... 525/247 |
| 5,859,143 A | * | 1/1999 | Tanaka et al. ......... 525/247 |
| 6,191,232 B1 | * | 2/2001 | Mitsutani et al. ...... 525/240 |

FOREIGN PATENT DOCUMENTS

| JP | 5-9226 | 1/1993 |
| JP | 8-73528 | 3/1996 |
| JP | 8-73529 | 3/1996 |
| JP | 9-31130 | 2/1997 |
| JP | 9-131837 | 5/1997 |

* cited by examiner

*Primary Examiner*—D. Lawrence Tarazano
(74) *Attorney, Agent, or Firm*—Oblon, Spivak, McClelland, Maier & Neustadt, P.C.

(57) ABSTRACT

The present invention relates to a polyolefin stretch packaging film, comprising at least one layer containing a component (A), and which has a storage modulus (E') of from $5.0 \times 10^8$ dyn/cm$^2$ to $5.0 \times 10^9$ dyn/cm$^2$ and a loss tangent (tan$\delta$) of from 0.2 to 0.8, as measured by dynamic viscoelasticity measurement at a frequency of 10 Hz and at a temperature of 20° C., wherein said component (A) is a soft polypropylene resin which satisfies the following conditions (1) to (3), which has a sum of mesopentad percentage and racemopentad percentage (mmmm+rrrr) of from 30 to 70% as obtained from $^{13}$C-NMR spectrum, in which crystalline block and non-crystalline block portions co-exist in the molecular chain and of which the stereoregularity is controlled.

10 Claims, No Drawings

POLYOLEFIN FILM FOR STRETCH PACKAGING

TECHNICAL FIELD

The present invention relates to a stretch film useful for food packaging. Particularly, it relates to a stretch packaging film made of a material containing no chlorine.

BACKGROUND ART

Heretofore, polyvinyl chloride type films have been mainly used as stretch packaging films for so-called prepackaging to wrap fruits, meats or prepared food placed on lightweight trays. Such polyvinyl chloride type films have not only properties suitable for packaging, such as good packaging efficiency and neat packaging finish, but also superiority in the product quality admitted by both distributors and consumers such that they are excellent in the elastic recovery to regain the initial shape even when deformed e.g. by a finger upon wrapping, they are excellent in the bottom sealing property, and peeling of films during transportation or display scarcely takes place, and thus the commercial value of the wrapped products can be maintained.

However, problems such as generation of hydrogen chloride gas during incineration and elution of plasticizers contained in large amounts, have been pointed out against the polyvinyl chloride type films. Accordingly, various studies have been made on materials to be substituted for the polyvinyl chloride type films. Particularly, stretch packaging films of various structures employing polyolefin type resins have been proposed. For example, stretch packaging films having structures of e.g. an ethylene-vinyl acetate copolymer (EVA), EVA/polybutene-1/EVA and EVA/linear ethylene-α-olefin copolymer/EVA have been proposed.

In recent years, studies have been actively made on stretch films of a three layer structure with two kinds, consisting of front and rear side layers of ethylene-vinyl acetate copolymer and an interlayer containing a polypropylene type resin as the main component, from reasons such as good surface property and transparency, moderate heat resistance, flexibility for materials design, economical efficiency, etc., as a stretch packaging film.

However, stretch films containing a polypropylene type resin as the main component, which have been proposed, are not fully satisfactory with respect to comprehensive evaluations in the market including principal properties suitable for packaging (automatic machine or manual packaging) such as packaging efficiency, packaging finish, elastic recovery and bottom sealing property, and economical efficiency.

The present inventors have proposed in JP-A-9-154479 a food packaging stretch film, which contains a relatively low crystalline propylene type polymer and petroleum resins, and has specific viscoelastic properties.

The film containing a propylene type polymer and petroleum resins as disclosed in the above-mentioned JP-A-9-154479 has relatively good properties such as packaging efficiency, packaging finish, elastic recovery and bottom sealing property, but is required to contain a relatively large amount (30 wt %) of petroleum resins in order to obtain desired viscoelastic properties. Accordingly, the strength of the film tends to change with time, or the petroleum resins tend to bleed out on the surface, thus causing blocking of the films when the films are rolled up, such being problematic.

DISCLOSURE OF THE INVENTION

The present inventors have conducted extensive studies and as a result, have succeeded to obtain a non-PVC type stretch film which is excellent in not only properties such as packaging efficiency, packaging finish, elastic recovery and bottom sealing property, but also stability of the film with time and economical efficiency, by using a specific soft polypropylene type resin, or by controlling viscoelastic properties. It is an object of the present invention to provide a polyolefin type stretch packaging film (hereinafter sometimes referred to as a stretch film or simply as a film), which has at least one layer containing the following component (A), and which has a storage modulus (E') of from $5.0 \times 10^8$ dyn/cm$^2$ to $5.0 \times 10^9$ dyn/cm$^2$ and a loss tangent (tan δ) of from 0.2 to 0.8, as measured by dynamic viscoelasticity measurement at a frequency of 10 Hz at a temperature of 20° C.:

(A) a soft polypropylene type resin which satisfies the following conditions (1) to (3), which has a sum of a mesopentad percentage and a racemopentad percentage (mmmm+rrrr) of from 30 to 70% as obtained from $^{13}$C-NMR spectrum, in which crystalline block and non-crystalline block portions co-exist in the molecular chain, and of which the stereoregularity is controlled:

(1) the glass transition temperature is at least -15° C. as measured by a differential scanning calorimeter by raising the temperature at a heating rate of 10° C./min;

(2) the quantity of heat of crystallization is from 10 to 60 J/g as measured by a differential scanning calorimeter by raising the temperature to 200° C. after the crystal fusion at a heating rate of 10° C./min, holding the resin at 200° C. for 5 minutes, and lowering the temperature to room temperature at a cooling rate of 10° C./min; and (3) the melt flow rate (MFR) is from 0.4 to 40 g/10 min (JIS K 7210, 230° C., 2.16 kg load).

With the stretch film of the present invention, cutting and transportation of the film and wrapping can be carried out without any problem when the film is used for packaging by e.g. an automatic packaging machine, and the bottom sealing property is excellent. Further, it is possible to obtain a wrapped product with the film tightly stretched. Thus, it has excellent properties which have not been seen with conventional non-chlorine type stretch films. Further, it is excellent also in stability with time and economical efficiency.

BEST MODE FOR CARRYING OUT THE INVENTION

Now, the present invention will be explained in detail.

The stretch film of the present invention has at least one layer containing the following component (A) and has specific viscoelastic properties as the entire film:

(A) a soft polypropylene type resin which satisfies the following conditions (1) to (3), which has a sum of a mesopentad percentage and a racemopentad percentage (mmmm+rrrr) of from 30 to 70% as obtained from $^{13}$C-NMR spectrum, in which crystalline block and non-crystalline block portions co-exist in the molecular chain, and of which the stereoregularity is controlled:

(1) the glass transition temperature is at least -15° C. as measured by a differential scanning calorimeter by raising the temperature at a heating rate of 10C./min;

(2) the quantity of heat of crystallization is from 10 to 60 J/g as measured by a differential scanning calorimeter by raising the temperature to 200° C. after the crystal fusion at a heating rate of 10° C./min, holding the resin at 200° C. for 5 minutes, and lowering the temperature to room temperature at a cooling rate of 10° C./min; and (3) the melt flow rate (MFR) is from 0.4 to 40 g/10 min (JIS K 7210, 230° C., 2.16 kg load).

Here, the soft polypropylene type resin as the above-mentioned component (A) in which crystalline block and non-crystalline block portions co-exist in the molecular chain, usually has such properties that it has rubber elasticity, is flexible and is less likely to be broken, and has a good transparency. Further, it is suitable to achieve the object of the present invention by balancing the proportion of the crystalline block portion of an isotactic structure and a syndiotactic structure showing stiffness with the non-crystalline block portion of an atactic structure showing elastomeric properties.

The co-existance of crystalline block and non-crystalline block portions in the molecular chain means that the crystalline block and the non-crystalline block portions are present randomly and/or blockwise. The chain length of each block portion may be optional, but the distribution of the block portions is preferably random from the viewpoint of transparency, appearance and the like in the present invention.

The polypropylene type resin is usually high crystalline and has high strength, and has a relatively high melting point and good heat resistance among polyolefin type resins, but a strong force is required for stretching it due to high crystallinity, and it shows only non-uniform stretchability, and such properties will remain even when it is made into a mixture. Accordingly, in the present invention, it is preferred to use a relatively low crystalline polypropylene type resin in order to obtain a film having good stretchability.

Conventionally, as the above-mentioned polypropylene type resin, ones having at least about 10 mol % of ethylene or an α-olefin having a carbon number of from about 4 to about 12 incorporated in propylene in a form of e.g. a copolymer, are popularly used in order to impart low-temperature properties and flexibility at room temperature, and some of them are used for film application, but such polypropylene type resins by themselves are not applicable to the present invention in view of viscoelasticity. Namely, with respect to a resin of this type which has conventionally been used popularly, a large amount of an α-olefin is incorporated in propylene, and thus the glass transition temperature becomes considerably low as compared with the glass transition temperature (in the vicinity of −10° C.) of polypropylene itself, whereby the loss tangent (tan δ) as mentioned hereinafter will be less than 0.1 and extremely small at room temperature.

The component (A) to be applied to the present invention is one which may satisfy viscoelastic properties as mentioned hereinafter, and which has an increased tan δ at room temperature by not significantly lowering the glass transition temperature as compared with the glass transition temperature (in the vicinity of −10° C.) of polypropylene itself, while lowering the crystallinity mainly by controlling the stereoregularity.

Specifically, as the condition (1), one having a glass transition temperature of at least −15° C., preferably at least −10° C., as measured by a differential scanning calorimeter by raising the temperature at a heating rate of 10° C./min, is used. If the glass transition temperature is less than −15° C., the peak temperature of the loss tangent (tan δ) tends to shift toward the low temperature side, whereby the value at room temperature intended by the present invention tends to be extremely small, such being unfavorable.

Further, as the condition (2), one having a quantity of heat of crystallization of from 10 to 60 J/g, preferably from 20 to 50 J/g, as measured by a differential scanning calorimeter by raising the temperature to 200° C. after the crystal fusion at a heating rate of 10° C./min, holding the resin at 200° C. for 5 minutes, and lowering the temperature to room temperature at a cooling rate of 10° C./min, is used. If the quantity of heat of crystallization is less than 10 J/g, the crystallinity tends to be too low, and the film-forming property tends to be very poor, and there will be a practical problem that the film will be so soft that the strength will be inadequate at room temperature. On the other hand, if the quantity of heat of crystallization exceeds 60 J/g, strong force will be required for stretching the film, and the stretching tends to be non-uniform, and consequently, such a film will not be suitable for a stretch film.

Further, as the condition (3), one having a melt flow rate (MFR) of from 0.4 to 40 g/10 min, preferably from 0.5 to 30 g/10 min, more preferably from 1.0 to 20 g/10 min, at 230° C. with a load of 2.16 kg, is used. One having a melt flow rate of less than 0.4 g/10 min is not suitable since the viscosity of the polymer itself tends to be too high, and the extrusion tends to be difficult. Further, if it exceeds 40 g/10 min, the viscosity of the polymer itself tends to be too low, whereby the film formation tends to be unstable, and there will be a practical problem that the strength of the film itself tends to be inadequate.

As such a soft polypropylene type resin, one having an insoluble content of at most 60 wt %, preferably from 2 to 50 wt %, in Soxhlet extraction with boiling n-heptane, having an insoluble content of at most 95 wt %, preferably from 50 to 90 wt %, in Soxhlet extraction with cold xylene, having monomer units of at least 90 mol %, preferably at least 95 mol %, based on propylene in the copolymer composition, and having a sum of a mesopentad percentage and a racemopentad percentage (mmmm+rrrr) controlled to be from 30 to 70%, is suitably used. Here, the component other than propylene may, for example, be ethylene, an α-olefin having a carbon number of from about 4 to about 12, 4-methylpentene-1, a cyclic olefin or styrene, and ethylene is most suitably used.

Here, if the insoluble content in the extraction with boiling n-heptane exceeds 60 wt %, or the insoluble content in the extraction with cold xylene exceeds 95 wt %, the crystallinity tends to be high, whereby the flexibility may decrease, and the loss tangent (tan δ) at room temperature intended by the present invention is less likely to be within a desired range, such being unfavorable.

Further, if the monomer units based on propylene are less than 90 mol %, the heat resistance may decrease, the range in which the crystallinity is controlled by stereoregularity tends to be narrow, or in a case where an α-olefin is copolymerized, the glass transition temperature tends to be considerably low as compared with the glass transition temperature (in the vicinity of −10° C.) of polypropylene itself, whereby the loss tangent (tan δ) at room temperature tends to be extremely small, and such is unfavorable from the viewpoint of economical efficiency also.

With respect to the stereoregularity, as one index indicating the proportion of the crystalline block portions, the sum of a mesopentad percentage and a racemopentad percentage (mmmm+rrrr) is from 30 to 70%, preferably the mesopentad percentage (mmmm) is from 25 to 60%, particularly preferably from 25 to 50%, and the sum of a mesopentad percentage and a racemopentad percentage (mmmm+rrrr) is controlled to be from 40 to 65%.

Here, if the above-mentioned (mmmm+rrrr) is less than 30%, the crystallinity tends to be too low, and the film-forming property tends to be very poor, and there will be a practical problem that the film will be so soft that the strength will be inadequate at room temperature. Further, the material itself is likely to undergo blocking, such being unfavorable in view of handling efficiency. On the other hand, if the above-mentioned (mmmm+rrrr) exceeds 70%, the loss tangent (tan δ) at room temperature intended by the present invention is less likely to be within a desired range, such being unfavorable. Further, strong force will be required for stretching the film, and the stretching tends to be non-uniform, and accordingly such a film will not be suitable for a stretch film.

The values of the mesopentad percentage (mmmm) and the racemopentad percentage (rrrr) used in the present invention are calculated based on the results of $^{13}$C-NMR (nuclear magnetic resonance) spectrum measurement. Namely, they are obtained by measuring $^{13}$C-NMR spectrum, from the signal intensity ratio of each peak (mmmm-mrrm) shown in a region of from 22.5 ppm to 19.5 ppm, by the difference in chemical shift due to stereoregularity of methyl groups. The above-mentioned mmmm (mesopentad percentage) means such a stereostructure that to a main chain of carbon-carbon linkages constituted by optional five continuous propylene units, all five methyl groups as side chains are located in the same direction, or a percentage of such a stereostructure. The above-mentioned rrrr (racemopentad percentage) means such a stereostructure that to a main chain of carbon-carbon linkages constituted by optional five continuous propylene units, five methyl groups as side chains are located alternately in opposite directions, or a percentage of such a stereostructure. Here, attribution of signals in the methyl group region is based on A. Zambelli et al (Macromolecules 8,687, (1975)).

Here, as the component (A), a mixture of at least two may be used so long as the object of the present invention will be satisfied.

Further, as a method for producing such a soft polypropylene type resin, a method of polymerizing a low-priced propylene monomer as the main component by using e.g. a metallocene type catalyst (single cite catalyst) or a solid titanium type catalyst to obtain a soft polypropylene type resin having a good forming processability and having the stereoregularity controlled, effectively at a low cost, has been proposed. The resin to be used is not particularly limited so long as the object of the present invention will be satisfied, and as a specific example of a commercial product, "REXflex", trade name, manufactured by Huntsman Polymer Corporation may be mentioned.

The content of the component (A) in the present invention varies depending upon e.g. film properties on which emphasis is put, and the type of the resin as mentioned hereinafter which constitutes the layer. However, the specific range of the content is approximately from 30 to 100 wt %, preferably from 40 to 90 wt %. If the content of the component (A) is less than 30 wt %, no adequate effect of the component (A) tends to be obtained, such being unfavorable. Further, it may be difficult to satisfy both E' and tan δ with the component (A) alone in some cases, and it is thereby preferred to incorporate another material.

As the film of the present invention, it is required to use one having a storage modulus (E') of from $5.0 \times 10^8$ dyn/cm$^2$ to $5.0 \times 10^9$ dyn/cm$^2$ and a loss tangent (tan δ) of from 0.2 to 0.8, as measured by dynamic viscoelasticity measurement at a frequency of 10 Hz at a temperature of 20° C.

Here, tan δ (loss tangent) is a ratio of the loss modulus (E") to the storage modulus (E'), i.e. loss tangent (tan δ=E"/E'), and at a temperature region at which this value is high, contribution of the loss modulus (E") of the material, i.e. the viscosity among viscoelastic properties, is great. Evaluation of the value of tan δ and the temperature region at which the tan δ shows a high value, is a great measure to judge e.g. stress relief behavior of the film in a packaging process by manual packaging or automatic packaging using the stretch film.

If the above-mentioned storage modulus E' is less than $5.0 \times 10^8$ dyn/cm$^2$, the film is so soft that the stress against deformation tends to be too small, whereby the packaging efficiency tends to be poor, and the tension of the film upon wrapping tends to be insufficient, and accordingly such a film is not suitable as a stretch film. On the other hand, if E' exceeds $5.0 \times 10^9$ dyn/cm$^2$, the film tends to be hard and poor in stretching, whereby deformation or crushing of trays is likely to be led. A suitable range of E' is from $8.0 \times 10^8$ dyn/cm$^2$ to $3.0 \times 10^9$ dyn/cm$^2$.

If tan δ is less than 0.2, the recovery behavior against stretching of the film tends to be instantaneous, and the film tends to recover in a short period of time before it is folded back at the bottom of a tray, whereby the film may not be well stretched, and wrinkles are likely to form. Further, with respect to the heat sealing condition at the bottom, in the case of stretch packaging, no adequate fusion by heat is usually conducted, whereby after packaging, Peeling of the bottom seal is likely to take place during the transportation or display. On the other hand, if tan δ exceeds 0.8, the packaging finish will be good, but the film tends to undergo plastic deformation, and the tension against an external force of the wrapped product tends to be so weak that during transportation or display, the film at the upper side of the tray tends to be slackened, for example, when wrapped products are piled up, whereby the commercial value is likely to be impaired. Further, in a case of automatic packaging, the film tends to be stretched in the longitudinal direction, whereby a problem such as chucking failure is likely to occur. A particularly preferred range of tan δ is from 0.30 to 0.60.

A stretch film may sometimes be used at low temperatures, and accordingly it is desired to have excellent low-temperature properties (particularly stretchability). For this purpose, the storage modulus (E') is preferably at most $1.5 \times 10^{10}$ dyn/cm$^2$, suitably at most $1.0 \times 10^{10}$ dyn/cm$^2$, as measured by dynamic viscoelasticity measurement at a frequency of 10 Hz at a temperature of 0° C.

The soft polypropylene type resin of which the stereoregularity is mainly controlled, to be applied to the present invention, has a higher glass transition temperature than other low crystalline polypropylene type resins. Accordingly, it is preferred to make arrangements to satisfy the above-mentioned properties, so as to secure flexibility such as low-temperature stretchability. For this purpose, e.g. the proportion of the crystalline block portions such as the mesopentad percentage (mmmm) and the racemopentad percentage (rrrr), the type and proportion of a component to be copolymerized with propylene, or the type of another resin to be incorporated therein, may be adjusted.

It is necessary to select an appropriate one as the above-mentioned component (A) in order that the viscoelastic properties of the film of the present invention are within the above-mentioned ranges. However, it may be difficult to satisfy both E' and tan δ with the component (A) alone in some cases, and accordingly it is practical to adjust the properties by incorporating another material or by laminating a layer of another material.

In the case of incorporating another material with the component (A), it is preferred to incorporate the following component (B), and as the case requires, the component (C) and/or the component (D), with the component (A) as the main component.

Here, the main component means that the content (wt %) of the component (A) is highest, preferably it exceeds 50 wt %, among compounded resins constituting the layer containing the component (A).

(B) A petroleum resin, a terpene resin, a coumarone-indene resin, a rosin type resin, or a hydrogenated derivative thereof.

(C) A polypropylene type resin other than the component (A).

(D) A copolymer of a vinyl aromatic compound with a conjugated diene, having a glass transition temperature of at most 0° C., or a hydrogenated derivative thereof.

The component (B) has a high glass transition temperature and increases the glass transition temperature of a mixture. This is effective to satisfy both the loss tangent (tan δ) showing moderate stress relief property and the storage modulus (E') showing suitable stretchability as a stretch film at room temperature.

Here, as the component (B), the petroleum resin may, for example, be an alicyclic petroleum resin from cyclopentadiene or its dimer, or an aromatic petroleum resin from a $C_9$ component, the terpene resin may, for example, be a terpene resin from β-pinene or a terpene-phenol resin, and the rosin type resin may, for example, be a rosin resin such as gum rosin or wood rosin, or an esterified rosin resin modified by e.g. glycerol or pentaerythritol. The above-mentioned component (B) is known to show a relatively good compatibility when mixed with e.g. the above-mentioned component (A), however, it is preferred to use a hydrogenated derivative in view of color tone, heat stability and compatibility.

The component (B) may have various glass transition temperatures primarily depending upon the molecular weight. However, suitable for the present invention is one having a glass transition temperature of from 50 to 100° C., preferably from 70 to 90° C. If the glass transition temperature is less than 50° C., when mixed with the above-described component (A), the component (B) is required to be incorporated in a large amount so as to obtain desired viscoelastic properties, whereby the blocking of the film or materials due to bleeding on the surface is likely to occur. Further, the mechanical strength of the entire film tends to be inadequate, and there will be a practical problem that the film is likely to break. On the other hand, if the glass transition temperature exceeds 100° C., the compatibility with the component (A) tends to be impaired, bleeding on the film surface is likely to take place with time, whereby blocking or decrease in transparency is likely to be led.

From the above-mentioned reasons, the content of the component (B) is preferably within a range of from 5 to 25 wt %, suitably the content is as low as possible so long as the above-described viscoelastic properties can be achieved. Here, if the content of the component (B) exceeds 25 wt %, such problems are likely to arise that the strength of the film may change with time, or the petroleum resins tend to bleed out on the surface, whereby blocking of films will occur when the films are rolled up, such being unfavorable. In this point of view, the soft polypropylene type resin of which the stereoregularity is controlled, which will be applied to the present invention, has a glass transition temperature of at least about −10° C., and accordingly it effectively works to adjust the viscoelastic properties to be within desired ranges even with so small amount of the component (B) as the content of at most about 20 wt %, as compared with a low crystalline polypropylene type resin having a large amount of e.g. an α-olefin incorporated in propylene, which has conventionally been used popularly.

The component (C) is a polypropylene type resin other than the component (A). In the present invention, said polypropylene type resin is a polypropylene type resin which is not defined as the component (A), and is a homopolymer of propylene or a copolymer of propylene with another monomer copolymerizable with propylene. As said another monomer copolymerizable with propylene, $C_{4-12}$ α-olefins such as ethylene, butene-1, hexene-1,4-methyl-pentene-1 and octene-1, and dienes such as divinyl benzene, 1,4-cyclohexadiene, dicyclopentadiene, cyclooctadiene and ethylidene norbornene, may, for example, be mentioned. Among them, preferred is ethylene.

Further, a propylene-ethylene random copolymer or a propylene-ethylene-butene-1 random copolymer is preferred in view of packaging mechanical properties and transparency when it is made into a mixture, and a low crystalline polypropylene type elastomer having a quantity of heat of crystallization of at most 50 J/g, preferably at most 40 J/g, is preferred with a purpose of improving low-temperature properties (particularly stretchability at a low temperature). As this low crystalline polypropylene type elastomer, preferred is a polypropylene type elastomer of reactor type in view of economical efficiency and transparency when it is made into a mixture, and its specific examples include "P.E.R.", trade name, manufactured by Tokuyama Corporation, "NEWCON", trade name, manufactured by Chisso Corporation, and "Catalloy", trade name, manufactured by Montell-JPO, which are commercially available.

Here, in a case where the polypropylene type resin as the component (C) is a copolymer of propylene with another monomer copolymerizable with propylene, the content of said another monomer is usually at most 40 wt %, preferably at most 30 wt %. Here, such polypropylene type resins may be used alone or in combination as a mixture of two or more of them.

Further, one having a melt flow rate (MFR) (JIS K 7210, 230° C., 2.16 kg load) of from 0.4 to 20 g/10 min, preferably from 0.5 to 5 g/10 min, is usually used.

Further, the component (D) is a copolymer of a vinyl aromatic compound with a conjugated diene, having a glass transition temperature of at most 0° C., or a hydrogenated derivative thereof.

Said copolymer usually has such properties that it has a rubber elasticity, is flexible and is less likely to be broken, and has a good transparency. Particularly, a hydrogenated derivative thereof has a good compatibility with the component (A), and accordingly, it effectively works to impart flexibility of a mixed resin layer at a low temperature, to enlarge the temperature region at which tan δ shows a high value, and to increase the transparency, etc. However, the glass transition temperature is required to be at most 0° C., preferably at most −20° C. If the glass transition temperature exceeds 0° C., the effects of e.g. imparting flexibility of a mixed resin layer at a low temperature, intended by adding the component (D), tend to be inadequate, such being unfavorable.

Further, in such a copolymer, the proportion of the vinyl aromatic compound to the conjugated diene is preferably from 3/97 to 40/60 by weight ratio. Here, if the vinyl aromatic compound in the copolymer composition is less than 3 wt %, the rigidity of the copolymer itself will be too low, and the pelletizing tends to be difficult, whereby the polymerization productivity will decrease, such being unfavorable. On the other hand, if it exceeds 40 wt %, the rigidity of the copolymer itself will be high, and the effects of e.g. imparting flexibility of a mixed resin layer at a low temperature, intended by adding the component (D), will be inadequate, such being unfavorable.

Here, as the vinyl aromatic compound, styrene is a representative example, but a styrene homologue such as α-methylstyrene may be used. Further, as the conjugated diene, 1,3-butadiene, isoprene or 1,3-pentadiene may, for example, be mentioned, and they may be used alone or in combination as a mixture of two or more of them. Further, as a third component, a small amount of a component other than the vinyl aromatic compound and the conjugated diene may be incorporated. However, the heat stability and weather resistance are extremely poor in a case where double bonds which are mainly vinyl bonds of the conjugated diene moiety remain, and to overcome such, it is preferred to use one having hydrogen added to at least 80%, preferably at least 95%, of the double bonds.

As such a copolymer, a styrene-butadiene block copolymer elastomer ("TUFPRENE", trade name, manufactured by Asahi Chemical Industry Co., Ltd.), a hydrogenated derivative of a styrene-butadiene block copolymer ("TUFTEC", trade name, manufactured by Asahi Chemical Industry Co., Ltd., "KRATON G", trade name, manufactured by Shell Japan), a hydrogenated derivative of a styrene-butadiene random copolymer ("DYNARON", trade name, manufactured by JSR CORPORATION), a hydrogenated derivative of a styrene-isoprene block copolymer ("SEPTON", trade name, manufactured by Kuraray Co., Ltd.), or a styrene-vinyl isoprene block copolymer elastomer ("HYBRAR", trade name, manufactured by Kuraray Co., Ltd.), may, for example, be commercially available. Such copolymers may be used alone or in combination as a mixture of two or more of them.

Among them, particularly preferred is a hydrogenated derivative of a styrene/conjugated diene type random copolymer having a styrene content of from 5 to 25 wt % and a vinyl bond amount of the conjugated diene moiety exceeding 60%, preferably from 65 to 90%, from the viewpoint of e.g. compatibility with the components (A), (B) and (C), increase in transparency and impartment of flexibility at a low temperature.

Here, a hydrogenated derivative of a styrene/conjugated diene type random copolymer useful for the present invention and a method for producing it are disclosed in detail in JP-A-2-158643, JP-A-2-305814 and JP-A-3-72512. Further, as a specific example of such a copolymer, "DYNARON 1320P", trade name, manufactured by JSR CORPORATION, which is a material having a structure of hydrogenated styrene butadiene rubber, and called HSBR for short, is commercially available.

Here, in a case where the above-described components (A) to (D) are combined and incorporated in the layer containing the component (A), the quantity of heat of crystallization of the mixed resin layer is preferably from 15 to 35 J/g, suitably from 20 to 35 J/g, as measured by a differential scanning calorimeter. Here, if the quantity of heat of crystallization of the mixed resin layer is less than 15 J/g, the drape, cutting property or strength of the film tends to decrease, or the heat resistance tends to decrease, such being unfavorable. On the other hand, if it exceeds 35 J/g, the drape, cutting property or strength of the film will improve, but e.g. recovery of pushed marks with a finger is likely to be impaired, such being unfavorable. This is considered to be because when the film undergoes significant deformation, distortions are likely to be distributed non-uniformly in the film, and the distortions are likely to remain, if the crystallinity of the mixed-resin layer is high. The quantity of heat of crystallization to be used here is a quantity of heat of crystallization as measured by a differential scanning calorimeter by raising the temperature of the resin composition constituting the mixed resin layer to 200° C. at a heating rate of 10° C./min, holding the resin composition at 200° C. for 5 minutes, and lowering the temperature to room temperature at a cooling rate of 10° C./min.

In a case where the film of the present invention is a laminated film, another resin layer may be a layer of a on-PVC type material such as a polyolefin type resin or flexible styrene-butadiene type elastomer. By laminating such a layer, not only the viscoelastic properties of the film will be adjusted, but also the tensile properties of the film will be improved, moderate strength and stretchability will be obtained, and stretchability at a low temperature will be improved.

Here, as the lamination material, particularly suitable is a polyolefin type resin from the viewpoint of imparting economical efficiency and surface properties. Use of e.g. a low-density polyethylene, a very low-density polyethylene (copolymer of ethylene with an α-olefin), an ethylene-vinyl acetate copolymer (EVA), an ethylene-alkylacrylate copolymer, an ethylene-alkylmethacrylate copolymer, an ethylene-acrylic acid copolymer, an ethylene-methacrylic acid copolymer, an ionomer resin or a propylene type elastomer material, may be recommended.

Practically, an EVA and/or a linear ethylene-α-olefin copolymer may be suitably used, and in the case of mixing them, the proportion may be optionally determined.

As the EVA, one having a vinyl acetate content of from 5 to 25 wt %, preferably from 10 to 20 wt %, and having a melt flow rate (MFR) of from 0.2 to 5 g/10 min (JIS K 7210, 190° C., 2.16 kg load), is suitable. Here, if the vinyl acetate content is less than 5 wt %, the film to be obtained will be hard and have decreased flexibility and elastic recovery, and the surface adhesion is less likely to be obtained. On the other hand, if it exceeds 25 wt %, the surface adhesion tends to be too intense, whereby the unwinding property or the appearance tends to be impaired.

Further, as the linear ethylene-α-olefin copolymer, preferred is one having an α-olefin content of from 5 to 25 wt %, preferably from 10 to 15 wt %, and having a MFR of from 0.2 to 5 g/10 min (JIS K 7210, 190° C., 2.16 kg load). Here, if the α-olefin content is less than 5 wt %, the film to be obtained tends to be hard, and no uniform stretchability tends to be obtained in stretch packaging, whereby wrinkles are likely to form on a wrapped product, or a wrapped product is likely to be broken. On the other hand, if it exceeds 25 wt %, the film formation tends to be difficult or the unwinding property tends to decrease. As the α-olefin, preferred is butene-1, hexene-1,4-methyl-pentene-1 or octene-1, having a carbon number of from 4 to 8, and they may be used alone or in combination as a mixture of two or more of them.

With respect to both the above-mentioned EVA and linear ethylene-α-olefin copolymer, if the MFR is less than 0.2 g/10 min, the extrusion processability tends to decrease, and on the other hand, if it exceeds 5 g/10 min, the film formation stability tends to decrease, and e.g. unevenness in thickness or decrease or dispersion in mechanical strength is likely to occur, such being unfavorable.

Here, the thickness of the film of the present invention is usually within a range commonly used for stretch packaging i.e. from about 8 to about 30 μm, typically within a range of from about 10 to about 20 μm. Further, in the case of a laminated film, the ratio of the thickness of the layer containing the component (A) to the total thickness is from 0.3 to 0.9, preferably from 0.4 to 0.8, and specifically it is preferably from 5 to 20 μm, from the viewpoint of properties as a stretch film and economical efficiency.

The film of the present invention is obtained by melt-extruding the material from an extruder and forming it into a film by inflation forming or T-die forming. In the case of a laminated film, it is advantageous to employ co-extrusion with a multilayer die using a plurality of extruders.

Practically, it is preferred to melt-extruding the material resin from a ring die, followed by inflation forming, and the blow-up ratio (bubble diameter/die diameter) in this case is preferably at least 4, particularly preferably within a range of from 5 to 7. The cooling method in this case may be either method of cooling from outside of the tube or a method of cooling from both outside and inside of the tube. Further, the film thus obtained may be heated to at most the crystallization temperature of the resin, and may be stretched from 1.2 to 5 times in the longitudinal direction of the film, or biaxially stretched from 1.2 to 5 times in both longitudinal and transverse directions, utilizing difference in rate between nip rolls.

To the film of the present invention, the following additive may optionally be incorporate in the surface layer and/or the layer containing the component (A), in order to impart properties such as an anti-fogging property, an antistatic property, a sliding property or a self-tack property.

It is preferred to incorporate from 0.1 to 12 parts lo by weight, suitably from 1 to 8 parts by weight, based on 100 parts by weight of the resin component constituting each layer, of at least one compound selected from the group consisting of aliphatic alcohol type fatty acid esters which are compounds of a $C_{1-12}$, preferably $C_{1-6}$, aliphatic alcohol with a $C_{10-22}$, preferably $C_{12-18}$, fatty acid, specifically glycerol monooleate, glycerol polyoleate, glycerol triricinoleate, glycerol acetyl ricinoleate, glycerol polystearate, glycerol polylaurate, methyl acetyl ricinoleate, ethyl acetyl ricinoleate, butyl acetyl ricinoleate, propylene glycol oleate, propylene glycol laurate, pentaerythritol oleate, polyethylene glycol oleate, polypropylene glycol oleate, sorbitan oleate, sorbitan laurate, polyethylene glycol sorbitan oleate, polyethylene glycol sorbitan laurate, etc., and polyalkylene ether polyols, specifically polyethylene glycol, polypropylene glycol, etc., and further, paraffin type oil, etc.

Now, the present invention will be explained in further detail with reference to Examples. However, the present invention is by no means restricted thereto. Various measurements and evaluations of a film as indicated in the present specification were carried out as follows. Here, the direction in which a film comes from an extruder (flow direction) is called a longitudinal direction, and the direction perpendicular thereto is called a transverse direction.

(1) E' and tan δ

They were measured by means of a viscoelasticity spectrometer VES-F3 manufactured by Iwamoto Seisakusho K.K. in a transverse direction of a film at a frequency of 10 Hz at a temperature-raising rate of 1° C./min from –50° C. to 150° C., and values at temperatures of 20° C. and 0° C. are shown from the obtained data.

(2) Stretch Packaging Properties

Using a stretch film with a width of 350 mm, a foamed polystyrene tray (length: 200 mm, width: 130 mm, height: 30 mm) was wrapped by an automatic packaging machine (ISHIDA.Wmin MK-II, manufactured by Ishida Koki K.K.), and evaluation was made with respect to items as identified in Table 3. Using the same film and tray, the packaging test was carried out by means of a manual packaging machine (Diawrapper A-105, manufactured by Mitsubishi Plastics Inc.).

(3) Glass Transition Temperature (Tg) and Melting temperature (Tm)

They were obtained from a thermogram obtained by raising the temperature of 10 mg of a sample at a heating rate of 10° C./min by means of DSC-7 manufactured by Perkin-Elmer in accordance with JIS K 7121.

(4) Crystallization Temperature (Tc) and Quantity of Heat of Crystallization (ΔHc)

They were obtained from a thermogram obtained by raising the temperature of 10 mg of a sample to 200° C. at a heating rate of 10° C./min, holding the sample at 200° C. for 5 minutes, and lowering the temperature to room temperature at a cooling rate of 10° C./min, by means of DSC-7 manufactured by Perkin-Elmer in accordance with JIS K 7121 and JIS K 7122.

(5) Melt Flow Rate (MFR)

Measurement was carried out in accordance with JIS K 7210 at a test temperature of 230°C. with a test load of 2.16 kgf, unless otherwise specified.

(6) Mesopentad Percentage (mmmm) and Racemopentad Percentage (rrrr)

They were obtained from a signal intensity ratio of each peak (mmmm-mrrm) shown in a region of from 22.5 ppm to 19.5 ppm by the difference in chemical shift due to the stereoregularity of methyl groups, by $^{13}$C-NMR spectrum measurement under the following conditions by means of JNM-GSX-270 ($^{13}$C-magnetic nuclear resonance frequency: 67.8 MHz) manufactured by Japan Electronics. Further, attribution of signals in the methyl group region was based on A. Zambelli et al (Macromolecules 8, 687, (1975)).

Measurement mode: $^1$H-complete decoupling

Pulse width: 8.6 microseconds

Pulse repetition period: 30 seconds

Integrated time: 7,200 times

Solvent: mixed solvent of orthodichlorobenzene/heavy benzene (80/20 vol %)

Sample concentration: 100 mg/1 ml solvent

Measurement temperature: 130° C.

(7) Change with Time

A roll of the obtained film was stored in a thermostatic chamber at a temperature of 50° C. under a humidity of 60% for 10 days, whereupon the surface state and rewindability were evaluated.

⊚: No bleeding of additives on the surface or blocking of films was observed.

○: Substantially no bleeding of additives on the surface was observed, but slight blocking of films was observed.

Δ: Slight bleeding of additives on the surface was observed, and rather remarkable peeling due to blocking of films was observed.

X: Substantial bleeding of additives on the surface and severe blocking of films were observed, and the film could not be used practically.

EXAMPLE 1

Component (A)

A film having a total thickness of 15 μm (2 μm/11 μm/2 μm) was obtained by coextrusion inflation forming at a temperature of three-layer ring dye of 190° C. with a blow-up ratio of 5.5, to form an interlayer having a thickness of 11 μm made of a soft polypropylene type resin (I) of which the stereoregularity was controlled (propylene content: 100 mol %, mmmm: 35.3%, rrrr: 15.4%, MFR: 16 g/10 min, Tm: 155° C., "REXflex W101" manufactured by Huntsman Polymer Corporation) and 2 μm each of the front and rear side layers made of a composition having 3.0 parts by weight of diglycerol monooleate as an antifogging agent melt-kneaded with 100 parts by weight of EVA (vinyl acetate content: 15 wt %, MFR at 190° C. with a load of 2.16 kg: 2.0 g/10 min).

Here, the properties measured with respect to a film made of the soft polypropylene type resin (I) alone were as follows.

Storage modulus (E') at 0° C.: $5.4 \times 10^9$ dyn/cm$^2$
Loss tangent (tan δ) at 0° C.: 0.45
Storage modulus (E') at 20° C.: $4.8 \times 10^8$ dyn/cm$^2$
Loss tangent (tan δ) at 20° C.: 0.34
Peak temperature of the loss tangent (tan δ) and its value: 5° C., 0.61
Glass transition temperature (Tg): −6° C.
Quantity of heat of crystallization (ΔHc): 25 J/g
Crystallization temperature (Tc): 99° C.

EXAMPLE 2

A film having a total thickness of 15 μm (2 μm/11 μm/2 μm) was obtained in the same manner as in Example 1 except that a mixed composition comprising 80 wt % of the soft polypropylene type resin (I) and 20 wt % of a hydrogenated derivative of a cyclopentadiene type petroleum resin having a softening point of 125° C. (glass transition temperature: 81° C.) (hereinafter referred to simply as a hydrogenated petroleum resin) was used as the material for the interlayer in Example 1.

Here, the properties measured with respect to a film made of the mixture comprising the soft polypropylene type resin (I) and the hydrogenated petroleum resin alone were as follows.

Storage modulus (E') at 0° C.: $1.9 \times 10^{10}$ dyn/cm$^2$
Storage modulus (E') at 20° C.: $1.4 \times 10^9$ dyn/cm$^2$
Loss tangent (tan δ) at 20° C.: 0.59
Glass transition temperature (Tg): 2° C.

EXAMPLE 3

A film having a total thickness of 15 μm (4 μm/7 μm/4 μm) was obtained in the same manner as in Example 1 except that the thickness ratio of the interlayer and the front and rear side layers in Example 2 was changed as above.

EXAMPLE 4

A film having a total thickness of 15 μm (2 μm/11 μm/2 μm) was obtained in the same manner as in Example 1 except that a soft polypropylene type resin (II) (propylene content: 100 mol %, mmmm: 44.5%, rrrr: 12.3%, MFR: 6 g/10 min, Tm: 158° C., "REXflex W110" manufactured by Huntsman Polymer Corporation) was used instead of the soft polypropylene type resin (I) in Example 2.

Here, the properties measured with respect to a film made of the soft polypropylene type resin (II) alone were as follows.

Storage modulus (E') at 0° C.: $1.1 \times 10^{10}$ dyn/cm$^2$
Loss tangent (tan δ) at 0° C.: 0.32
Storage modulus (E') at 20° C.: $1.5 \times 10^9$ dyn/cm$^2$
Loss tangent (tan δ) at 20° C.: 0.25
Peak temperature of the loss tangent (tan δ) and its value: 5° C., 0.42
Glass transition temperature (Tg): −7° C.
Quantity of heat of crystallization (ΔHc): 35 J/g
Crystallization temperature (Tc): 102° C.

Further, the properties measured with respect to a film made of the mixture comprising the soft polypropylene type resin (II) and the hydrogenated petroleum resin alone were as follows.

Storage modulus (E') at 0° C.: $1.8 \times 10^{10}$ dyn/cm$^2$
Storage modulus (E') at 20° C.: $2.6 \times 10^9$ dyn/cm$^2$
Loss tangent (tan δ) at 20° C.: 0.49
Glass transition temperature (Tg): 5° C.

EXAMPLE 5

A film having a total thickness of 15 μm (2 μm/11 μm/2 μm) was obtained in the same manner as in Example 1 except that a mixed composition comprising 70 wt % of the soft polypropylene type resin (I), 10 wt % of the hydrogenated petroleum resin used in Example 2, and 20 wt % of a propylene-ethylene random copolymer (ethylene content: 4 mol %, MFR: 1.1 g/10 min, Tm: 147° C.) was used as the material for the interlayer in Example 1.

EXAMPLE 6

A film having a total thickness of 15 μm (2 μm/11 μm/2 μm) was obtained in the same manner as in Example 1 except that a mixed composition comprising 50 wt % of the soft polypropylene type resin (I), 20 wt % of the hydrogenated petroleum resin used in Example 2 and 30 wt % of a low crystalline propylene-ethylene-propylene copolymer elastomer (propylene content: 88 mol %, ethylene content: 12 mol %, MFR: 1.5 g/10 min, Tm: 156° C., "P.E.R.T310J" manufactured by Tokuyama Corporation) (hereinafter referred to simply as PER) was used as the material for the interlayer in Example 1.

Here, the properties measured with respect to a film made of the above-mentioned PER alone were as follows.

Storage modulus (E') at 0° C.: $3.6 \times 10^9$ dyn/cm$^2$
Loss tangent (tan δ) at 0° C.: 0.14
Storage modulus (E') at 20° C.: $2.1 \times 10^9$ dyn/cm$^2$
Loss tangent (tan δ) at 20° C.: 0.07
Peak temperature of the loss tangent (tan δ) and its value: −10° C., 0.18
Glass transition temperature (Tg): −25° C.
Quantity of heat of crystallization: 31 J/g
Crystallization temperature (Tc): 101° C.

EXAMPLE 7

A film having a total thickness of 15 μm (2 μm/11 μm 2 μm) was obtained in the same manner as in Example 1 except that a mixed composition comprising 40 wt % of a soft polypropylene type resin (III) (propylene content: 97 mol %, ethylene content: 3 mol %, mmmm: 32.1%, rrrr: 14.5%, MFR: 6 g/10 min, Tm: 150° C., "REXflex W210" manufactured by Huntsman Polymer Corporation), 20 wt % of the hydrogenated petroleum resin used in Example 2, 30 wt % of the propylene-ethylene random copolymer used in Example 5 and 10 wt % of a hydrogenated styrene-butadiene rubber (styrene content: 10%, vinyl bond amount of the conjugated diene moiety: 78%, specific gravity: 0.89, MFR: 3.5 g/10 min, Tg: −50° C., "DYNARON 1320P" manufactured by JSR CORPORATION) was used as the material for the interlayer instead of the soft polypropylene type resin (I) in Example 1.

Here, the properties measured with respect to a film made of the above-mentioned soft polypropylene type resin (III) alone were as follows.

Storage modulus (E') at 0° C.: 5.4×10⁹ dyn/cm²
Loss tangent (tan δ) at 0° C.: 0.50
Storage modulus (E') at 20° C.: 3.5×10⁸ dyn/cm²
Loss tangent (tan δ) at 20° C.: 0.33
Peak temperature of the loss tangent (tan δ) and its value: 7° C., 0.65
Glass transition temperature (Tg): −70° C.
Quantity of heat of crystallization (ΔHc): 22 J/g
Crystallization temperature (Tc): 92° C.

Comparative Example 1

A film having a total thickness of 15 μm (2 μm/11 μm/2 μm) was obtained in the same manner as in Example 1 except that the PER used in Example 6 was used as the material for the interlayer instead of the soft polypropylene type resin (I) in Example 1.

Comparative Example 2

A film having a total thickness of 15 μm (2 μm/11 μm/2 μm) was obtained in the same manner as in Example 1 except that a soft polypropylene type resin (IV) (propylene content: 100 mol %, mmmm: 63.0%, rrrr: 8.0%, MFR: 2 g/10 min, Tm: 158° C., "REXflex W105" manufactured by Huntsman Polymer Corporation) was used as the material for the interlayer instead of the soft polypropylene type resin (I) in Example 1.

Here, the properties measured with respect to a film made of the above-mentioned soft polypropylene type resin (IV) alone were as follows.

Storage modulus (E') at 0° C.: 1.6×10¹⁰ dyn/cm²
Loss tangent (tan δ) at 0° C.: 0.17
Storage modulus (E') at 20° C.: 3.7×10⁹ dyn/cm²
Loss tangent (tan δ) at 20° C.: 0.14
Peak temperature of the loss tangent (tan δ) and its value: 8° C., 0.26
Glass transition temperature (Tg): −6° C.
Quantity of heat of crystallization (ΔHc): 54 J/g
Crystallization temperature (Tc): 108° C.

Comparative Example 3

A film having a total thickness of 15 μm (2 μm/11 μm/2 μm) was obtained in the same manner as in Example 2 except that the PER used in Example 6 was used instead of the soft polypropylene type resin (I) in Example 2.

Here, the properties measured with respect to a film made of the mixture comprising the PER and the hydrogenated petroleum resin alone were as follows.

Storage modulus (E') at 0° C.: 4.8×10⁹ dyn/cm²
Storage modulus (E') at 20° C.: 1.2×10⁹ dyn/cm²
Loss tangent (tan δ) at 20° C.: 0.23
Glass transition temperature (Tg): −16° C.

Comparative Example 4

A film having a total thickness of 15 μm (2 μm/11 μm/2 μm) was obtained in the same manner as in Example 1 except that a mixed composition comprising 70 wt % of the PER used in Example 6 and 30 wt % of the hydrogenated petroleum resin used in Example 2 was used as the material for the interlayer in Example 1.

Here, the properties measured with respect to a film made of the mixture comprising the PER and the hydrogenated petroleum resin alone were as follows.

Storage modulus (E') at 0° C.: 9.0×10⁹ dyn/cm²
Storage modulus (E') at 20° C.: 2.0×10⁹ dyn/cm²
Loss tangent (tan δ) at 20° C.: 0.35
Glass transition temperature (Tg): −7° C.

Comparative Example 5

A film having a total thickness of 15 μm (2 μm/11 μm/2 μm) was obtained in the same manner as in Example 2 except that the soft polypropylene type resin (IV) used in Comparative Example 2 was used instead of the soft polypropylene type resin (I) in Example 2.

Here, the properties measured with respect to a film made of the mixture comprising the soft polypropylene type resin (IV) and the hydrogenated petroleum resin alone were as follows.

Storage modulus (E') at 0° C.: 2.2×10¹⁰ dyn/cm²
Storage modulus (E') at 20° C.: 6.5×10⁹ dyn/cm²
Loss tangent (tan δ) at 20° C.: 0.26
Glass transition temperature (Tg): 6° C.

Comparative Example 6

A film having a total thickness of 15 μm (2 μm/11 μm/2 μm) was formed in the same manner as in Example 1 except that a low-molecular weight polypropylene type resin (propylene content: 100 mol %, mmmm: 39.8%, rrrr: 6.7%, melt viscosity at 190° C.: 8000 cps (MFR exceeded 40 g/10 min), Tg: −13° C., Tm: 154° C., Tc: 95° C., ΔHc: 25 J/g, "UBETAC APAO UT2180" manufactured by Ube Industries, Ltd.) was used as the material for the interlayer in Example 1. However, the melt viscosity of the mixed resin composition as the interlayer was extremely low, whereby no film could be taken.

Comparative Example 7

Evaluation was made with respect to a commercially available polyvinyl chloride stretch film (thickness: 15 μm).

With respect to the above-mentioned Examples 1 to 7 and Comparative Examples 1 to 7, measured values of e.g. viscoelastic properties of the laminated film (monolayer in Comparative Example 7) are shown in Table 1, and evaluations for e.g. stretch packaging properties are shown in Table 2.

TABLE 1

|  | 20° C. | | 0° C. | ΔHc (J/g) of |
| --- | --- | --- | --- | --- |
|  | E' | tan δ | E' | interlayer |
| Ex. 1 | 8.6 × 10⁸ | 0.27 | 5.2 × 10⁹ | 25 |
| Ex. 2 | 1.4 × 10⁹ | 0.47 | 1.3 × 10¹⁰ | 22 |
| Ex. 3 | 1.3 × 10⁹ | 0.36 | 9.3 × 10⁹ | 22 |
| Ex. 4 | 2.3 × 10⁹ | 0.43 | 1.4 × 10¹⁰ | 27 |
| Ex. 5 | 1.8 × 10⁹ | 0.31 | 1.3 × 10¹⁰ | 35 |
| Ex. 6 | 1.2 × 10⁹ | 0.38 | 9.3 × 10⁹ | 24 |
| Ex. 7 | 1.8 × 10⁹ | 0.37 | 9.9 × 10⁹ | 31 |
| Comp. Ex. 1 | 1.8 × 10⁹ | 0.07 | 3.3 × 10⁹ | 31 |
| Comp. Ex. 2 | 3.0 × 10⁹ | 0.14 | 1.2 × 10¹⁰ | 54 |
| Comp. Ex. 3 | 1.2 × 10⁹ | 0.17 | 4.1 × 10⁹ | 23 |
| Comp. Ex. 4 | 1.7 × 10⁹ | 0.26 | 6.5 × 10⁹ | 21 |
| Comp. Ex. 5 | 5.1 × 10⁹ | 0.25 | 1.7 × 10¹⁰ | 44 |
| Comp. Ex. 6 | No sample taken | | | |
| Comp. Ex. 7 | 1.9 × 10⁹ | 0.35 | 5.5 × 10⁹ | — |

TABLE 2

| Evaluation items | Manual packaging Wrinkles | Manual packaging Break resistance | Automatic packaging Cutting, transportation | Automatic packaging Finish | Common Bottom sealing | Common Recovery | Common Tension | Low-temperature properties | Change with time | Overall evaluation* |
|---|---|---|---|---|---|---|---|---|---|---|
| Ex. 1 | ○ | ◎ | ○ | ○ | ◎ | ○ | ◎ | ◎ | ◎ | ○ |
| Ex. 2 | ○ | ○ | ○ | ◎ | ◎ | ○ | ◎ | ○ | ○ | ○ |
| Ex. 3 | ○ | ○ | ○ | ○ | ◎ | ○ | ◎ | ◎ | ◎ | ◎ |
| Ex. 4 | ◎ | ○ | ◎ | ◎ | ◎ | ○ | ◎ | ○ | ○ | ◎ |
| Ex. 5 | ◎ | ◎ | ◎ | ◎ | ◎ | ○ | ◎ | ○ | ◎ | ◎ |
| Ex. 6 | ○ | ○ | ○ | ◎ | ◎ | ○ | ◎ | ◎ | ○ | ◎ |
| Ex. 7 | ○ | ◎ | ◎ | ○ | ◎ | ◎ | ◎ | ◎ | ◎ | ◎ |
| Comp. Ex. 1 | ○ | ○ | △ | x | △ | △ | ◎ | ◎ | ◎ | x |
| Comp. Ex. 2 | ○ | ○ | ○ | △ | △ | △ | ◎ | ○ | ◎ | △ |
| Comp. Ex. 3 | ○ | ○ | △ | △ | △ | △ | ◎ | ◎ | △ | △ |
| Comp. Ex. 4 | ○ | ○ | ○ | ○ | ○ | ○ | ◎ | ◎ | x | x |
| Comp. Ex. 5 | △ | ○ | ◎ | ○ | ○ | △ | ◎ | △ | ○ | △ |
| Comp. Ex. 6 | △ | | | No sample taken | | | | | | x |
| Comp. Ex. 7 | ◎ | ◎ | ◎ | ○ | ◎ | ◎ | ◎ | ◎ | ○ | ◎ |

*Standards for overall evaluation
◎: With respect to all items, evaluation was ○ or ◎, and there were at least four ◎.
○: With respect to all items, evaluation was ○ or ◎, but there were at most three ◎.
△: No item was evaluated to be x, but there was at least one △.
x: At least one item was evaluated to be x.

TABLE 3

| | | Evaluation method | Evaluation standards x | Evaluation standards △ | Evaluation standards ○ | Evaluation standards ◎ |
|---|---|---|---|---|---|---|
| Manual packaging | Wrinkles | The film at the tray corner portion where wrinkles were most likely to form was evaluated | Large wrinkles | Some wrinkles | Few wrinkles | No wrinkles |
| | Break resistance | Breakability at the tray corner portion where breakage was most likely to occur was evaluated | Highly breakable | Rather breakable | Occasionally breakable | Substantially not breakable |
| Automatic packaging | Cutting, transportation | Curling of cut surface upon cutting and chuck state during transportation were evaluated | Cutting and transportation infeasible | Rather problematic | Tolerably | Not problematic at all |
| | Finish properties | Packaging condition (tension intensity) was changed among 25 levels, and the ratio of a level with good packaging finish was evaluated | 0/25 to 3/25 | 4/25 to 10/25 | 11/25 to 15/25 | 16/25 to 25/25 |
| Common | Bottom sealing property | The sealing state after packaging at a hot plate temperature of 100° C. was evaluated | Holes due to heat and peelings were likely to occur | Some peelings | Few peelings | No peeling with normal handling |
| | Recovery | The state of a pushed mark after the center portion of a packed product was pushed to the bottom with a finger was evaluated | Pushed mark completely remained | Pushed mark significantly remained | Pushed mark slightly remained | Completely recovered |

TABLE 3-continued

| | | Evaluation standards | | | |
|---|---|---|---|---|---|
| | Evaluation method | x | Δ | ○ | ⊚ |
| Tension of film | Resilience when the upper portion of a packed product was pressed with a hand and sagging when packed products were piled up, were evaluated | Too weak tension with saggings | Considerably weak tension | Slightly weak tension | Good tension and resilience |
| Low-temperature properties | Breakability and deformation of the tray when packaged at 5° C. were evaluated | Film breakage and tray deformation occurred | Film breakage and tray were likely to occur | Film breakage and tray sometimes occurred | Not problematic |

From Tables 1 to 3, it is evident that all the films obtained in Examples 1 to 7 having properties within the ranges specified by the present invention, are fully excellent in various properties as a stretch film. On the other hand, it is evident that the films of Comparative Examples 1 to 6 having a different component or having viscoelastic properties beyond the ranges specified by the present invention, are poor in overall properties as a stretch film.

What is claimed is:

1. A polyolefin stretch packaging film, comprising at least one layer containing a component (A), wherein said component (A) is a soft polypropylene resin which satisfies the following conditions (1) to (3),
   (1) the glass transition temperature is at least −15° C. as measured by a differential scanning calorimeter by raising the temperature at a heating rate of 10° C./min,
   (2) the quantity of heat of crystallization is from 10 to 60 J/g as measured by a differential scanning calorimeter by raising the temperature to 200° C. after the crystal fusion at a heating rate of 10° C./min, holding the resin at 200° C. for 5 minutes, and lowering the temperature to room temperature at a cooling rate of 10° C./min,
   (3) the melt flow rate (MFR) is from 0.4 to 40 g/10 min. (JIS K 7210, 230° C., 2.16 kg load); and
which has a sum of mesopentad percentage and racemopentad percentage (mmmm+rrrr) of from 30 to 70% as obtained from $^{13}$C-NMR spectrum, in which crystalline block and non-crystalline block portions co-exist in the molecular chain and of which the stereoregularity is controlled, and wherein said polyolefin stretch packaging film has a storage modulus (E') of from $5.0 \times 10^8$ dyn/cm$^2$ to $5.0 \times 10^9$ dyn/cm$^2$ and a loss tangent (tan δ) of from 0.2 to 0.8, as measured by dynamic viscoelasticity measurement at a frequency of 10 Hz and at a temperature of 20° C.

2. The polyolefin stretch packaging film according to claim 1, wherein a component (B) is incorporated in an amount of from 5 to 25 wt % in said layer containing said component (A), wherein said component (B) is a petroleum resin, a terpene resin, a coumarone-indene resin a rosin resin, or a hydrogenated derivative thereof.

3. The polyolefin stretch packaging film according to claim 1, wherein the component (B), and at least one of component (C) or component (D) are incorporated in the layer containing, as the main component, said component (A), wherein
   said component (C) is a polypropylene resin other than the component (A), and
   said component (D) is a copolymer of a vinyl aromatic compound with a conjugated diene, having a glass transition temperature of at most 0° C., or a hydrogenated derivative thereof.

4. The polyolefin stretch packaging film according to claim 1, wherein the layer containing the component (A) has a quantity of heat of crystallization of from 15 to 35 J/g as measured by a differential scanning calorimeter.

5. The polyolefin stretch packaging film according to claim 1, wherein said polyolefin stretch packaging film has a storage modulus (E') of at most $1.5 \times 10^{10}$ dyn/cm$^2$ as measured by dynamic viscoelasticity measurement at a frequency of 10 Hz and a temperature of 0° C.

6. The polyolefin stretch packaging film according to claim 1, wherein said component (A) contains at least 95 mol % of monomer units based on propylene, and has a mesopentad percentage (mmmm) of from 25 to 50% and a sum of mesopentad percentage and racemopentad percentage (mmmm+rrrr) of from 40 to 65% as obtained from $^{13}$C-NMR spectrum.

7. The polyolefin stretch packaging film according to claim 2, wherein the component (B) is incorporated in an amount of from 5 to 20 wt % in the layer containing said component (A), and said component (B) has a glass transition temperature of from 50 to 100° C.

8. The polyolefin stretch packaging film according to claim 3, wherein said component (C) is a polypropylene resin selected from the group consisting of a propylene-ethylene copolymer, a propylene-ethylene-1-butene copolymer, and a low crystalline polypropylene elastomer.

9. The polyolefin stretch packaging film according to claim 3, wherein the component (D) is a hydrogenated derivative of a styrene/conjugated diene random compolymer having a styrene content of from 2 to 25 wt % and a vinyl bond amount of the conjugated diene moiety exceeding 60%.

10. The polyolefin stretch packaging film according to claim 1, which has a surface layer containing, as a main component, at least one of an ethylene-vinyl acetate copolymer having a melt flow rate (MFR) of from 0.2 to 5.0 g/min (JIS K 7210, 190° C., 2.16 kg load) and a vinyl acetate content of from 5 to 25 wt % or a linear ethylene-α-olefin copolymer having a $C_{4-8}$ α-olefin content of from 5 to 25% laminated on at least one side of the layer containing said component (A).

* * * * *